United States Patent Office.

JOHN KNAPP, OF PRATTSBURG, NEW YORK.

Letters Patent No. 105,342, dated July 12, 1870.

IMPROVEMENT IN PRESERVING EGGS.

The Schedule referred to in these Letters Patent and making part of the same.

I, JOHN KNAPP, of Prattsburg, in the county of Steuben and State of New York, have invented a certain Process for Preserving Eggs, of which the following is a specification.

I take any kind of a receptacle that I wish to preserve eggs in, and cover the bottom with sulphate of lime; then put in some eggs, and not have them touch the sides of the receptacle; then cover the eggs with the sulphate of lime; then put in more eggs, and cover as before; and, finally, cover them sufficiently to exclude the air from the eggs, or a few inches in thickness of the last covering.

If air-tight receptacles are used, such as stone or earthenware, less thickness of the sulphate is required about the sides of the receptacle.

Any of the varieties of sulphate of lime may be used that is most convenient, and any of the well-known means of preparing it may be employed, and, in the form of an impalpable powder, it may be more conveniently applied, and, in this manner, it may be applied for preserving animal and vegetable substances, they being first enveloped with cloth or paper.

What I claim as my invention, and desire to secure by Letters Patent, is—

The process of preserving eggs, herein described, the same consisting in placing the eggs in a vessel, and covering them with a dry powdered sulphate of lime, as described.

JOHN KNAPP.

Witnesses:
F. H. HOPKINS,
CHARLES KETCHUM.